United States Patent
Fukawatase

(10) Patent No.: US 9,527,469 B2
(45) Date of Patent: Dec. 27, 2016

(54) VEHICLE AIRBAG SYSTEM

(75) Inventor: Osamu Fukawatase, Miyoshi (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 14/369,629

(22) PCT Filed: Dec. 29, 2011

(86) PCT No.: PCT/JP2011/080533
§ 371 (c)(1),
(2), (4) Date: Jun. 27, 2014

(87) PCT Pub. No.: WO2013/099036
PCT Pub. Date: Jul. 4, 2013

(65) Prior Publication Data
US 2014/0361521 A1   Dec. 11, 2014

(51) Int. Cl.
*B60R 21/013* (2006.01)
*B60R 21/231* (2011.01)
*B60R 21/0136* (2006.01)
*B60R 21/015* (2006.01)
*B60R 21/00* (2006.01)

(52) U.S. Cl.
CPC .......... *B60R 21/231* (2013.01); *B60R 21/013* (2013.01); *B60R 21/0136* (2013.01); *B60R 21/01552* (2014.10); *B60R 2021/0023* (2013.01); *B60R 2021/0048* (2013.01); *B60R 2021/23107* (2013.01)

(58) Field of Classification Search
CPC .......... B60R 2021/01034; B60R 2021/01211; B60R 2021/01231; B60R 21/0136; B60R 21/013; B60R 21/015; B60R 2021/0023; B60R 2021/23107

USPC ..................................................... 280/730.1
See application file for complete search history.

(56) References Cited

U.S. PATENT DOCUMENTS

| 6,390,498 | B1* | 5/2002 | Francis ................ B60R 21/013 180/282 |
| 6,898,498 | B1* | 5/2005 | Wessels et al. ................ 701/45 |
| 7,712,776 | B2* | 5/2010 | Prakah-Asante et al. ..... 280/735 |
| 2001/0037170 | A1* | 11/2001 | Morell et al. .................. 701/45 |

(Continued)

FOREIGN PATENT DOCUMENTS

| JP | A-6-239195 | 8/1994 |
| JP | A-2001-55108 | 2/2001 |

(Continued)

Primary Examiner — James English
(74) Attorney, Agent, or Firm — Oliff PLC

(57) ABSTRACT

A vehicle airbag system (10) includes a front passenger side airbag (40) that is stored on a front passenger seat (28) side of an instrument panel 26, and that inflates and deploys toward the front passenger seat (28) side by a first inflator (38) being activated and gas being supplied; a curtain airbag (62) that is stored between a roof side rail portion (56) and a roof head lining (58), and that is inflated and deployed to an inside of a front side door (88) by a second inflator (64) being activated and gas being supplied; and a controller (82) that is connected to the first inflator (38) and the second inflator (64), and that, when a small overlap collision occurs, activates the first inflator (38), and then after inflation and deployment of the front passenger side airbag (40) is complete, activates the second inflator (64).

6 Claims, 9 Drawing Sheets

(56) References Cited

U.S. PATENT DOCUMENTS

| | | | |
|---|---|---|---|
| 2003/0075906 A1* | 4/2003 | Inoue et al. | 280/730.2 |
| 2006/0186656 A1* | 8/2006 | Kumagai | 280/743.2 |
| 2006/0196715 A1* | 9/2006 | Fujishiro et al. | 180/271 |
| 2007/0138778 A1* | 6/2007 | Takemura | B60R 21/232 280/743.1 |
| 2008/0129023 A1* | 6/2008 | Heigl | B60R 21/232 280/730.1 |
| 2008/0296876 A1* | 12/2008 | Ideue | 280/730.2 |
| 2009/0099749 A1* | 4/2009 | Hayasaka et al. | 701/70 |
| 2011/0022275 A1* | 1/2011 | Oosaki | 701/45 |
| 2013/0001933 A1* | 1/2013 | Umehara et al. | 280/730.2 |
| 2013/0168950 A1* | 7/2013 | Nakamura | B60R 21/232 280/728.2 |
| 2014/0346758 A1* | 11/2014 | Mueller et al. | 280/730.2 |

FOREIGN PATENT DOCUMENTS

| | | |
|---|---|---|
| JP | A-2006-88856 | 4/2006 |
| JP | A-2006-232267 | 9/2006 |
| JP | A-2007-153224 | 6/2007 |
| JP | A-2008-230610 | 10/2008 |
| JP | A-2009-35158 | 2/2009 |
| JP | A-2009-96297 | 5/2009 |
| JP | A-2011-25760 | 2/2011 |

\* cited by examiner

VEHICLE AIRBAG SYSTEM

TECHNICAL FIELD

The invention relates to a vehicle airbag system.

BACKGROUND ART

Currently, a variety of types of airbag devices, such as a driver side airbag device, a front passenger side airbag device, a curtain airbag device, and a side airbag device. are mounted in vehicles (see Patent Document 1 to Patent Document 6). Patent Document 1 described below describes a deployment method of a vehicle airbag that deploys both an airbag device for a frontal collision and an airbag device for a side collision, when there is a collision from a diagonal direction. More specifically, with this prior art, airbag deployment control is performed to deploy the airbag device for a side collision approximately 100 [ms] later than the airbag device for a frontal collision. As a result, the airbag device for a side collision is able to be deployed at a timing at which lateral inertia force actually acts on an occupant when there is a collision from a diagonal direction.

Patent Document 1: Japanese Patent Application Publication No. 2007-153224
Patent Document 2: Japanese Patent Application Publication No. 06-239195
Patent Document 3: Japanese Patent Application Publication No. 2006-088856
Patent Document 4: Japanese Patent Application Publication No. 2008-230610
Patent Document 5: Japanese Patent Application Publication No. 2001-055108
Patent Document 6: Japanese Patent Application Publication No. 2011-025760

DISCLOSURE OF THE INVENTION

Problems to be Solved by the Invention

The prior art described above is also thought to be one effective technology. However, with the technology described in the prior art, even if it operates effectively as airbag deployment control when there is a collision from a diagonal direction, no consideration is given to a so-called small overlap collision in which another vehicle frontally collides with a narrow region that is on the outside, in a vehicle width direction, of a front side member of a host vehicle. That is, when a small overlap collision occurs, on the front passenger side, after a head of an occupant inertially moves diagonally forward toward a front pillar side and is received by the front passenger side airbag, it then rebounds and moves to the outside toward the rear of the vehicle. The airbag deployment control according to the prior art described above is not able to handle a small overlap collision that produces this kind of behavior.

Taking this fact into account, it is an object of the invention to obtain a vehicle airbag system capable of effectively protecting the head of an occupant seated in a front passenger seat when a small overlap collision occurs.

Means for Solving the Problems

A vehicle airbag system according to a first aspect includes a front passenger side airbag that is stored on a front passenger seat side of an instrument panel, and that inflates and deploys toward the front passenger seat side by a first inflator being activated and gas being supplied; a curtain airbag that is stored between a roof side rail portion and a roof head lining, and that is inflated and deployed to an inside of a side door by a second inflator being activated and gas being supplied; and a controller that is connected to the first inflator and the second inflator, and that, when a small overlap collision occurs, activates the first inflator, and then after inflation and deployment of the front passenger side airbag is complete, activates the second inflator.

A vehicle airbag system according to a second aspect further includes, in the first aspect, a side airbag that is stored in a door trim or a side portion on a side door side of a seat back, and that is inflated and deployed toward a seat front side by a third inflator being activated and gas being supplied. The controller activates the third inflator after activating the second inflator.

A vehicle airbag system according to a third aspect is such that, in the first aspect or the second aspect, the front passenger side airbag has an airbag structure in which an amount that an outside chamber that is inflated and deployed on an outside in a vehicle width direction protrudes toward a vehicle rear side is larger than an amount that an inside chamber that is inflated and deployed on an inside in the vehicle width direction protrudes toward the vehicle rear side.

A vehicle airbag system according to a fourth aspect is such that, in the first aspect or the second aspect, the front passenger side airbag is such that an internal pressure of an outside chamber that is inflated and deployed on an outside in a vehicle width direction is set higher than an internal pressure of an inside chamber that is inflated and deployed on an inside in the vehicle width direction.

A vehicle airbag system according to a fifth aspect is such that, in any one aspect from the first aspect to the fourth aspect, when an inflated and deployed state of the curtain airbag and the front passenger side airbag is viewed in a side view, a delay chamber that is inflated and deployed later than a main body portion of the curtain airbag is set in an area where the curtain airbag and the front passenger side airbag overlap, in the curtain airbag.

According to the first aspect, when a small overlap collision occurs, the head of an occupant seated in the front passenger seat inertially moves diagonally forward with respect to the vehicle (toward a front pillar side).

Here, with the vehicle airbag system according to this aspect, when a small overlap collision occurs, the first inflator is first activated by the controller. Consequently, gas is supplied into the front passenger side airbag stored on the front passenger seat site of an instrument panel. As a result, the front passenger side airbag is inflated and deployed toward the front passenger seat side, and receives the head of the occupant that has inertially moved diagonally forward with respect to the vehicle.

However, the head of the seated occupant that is received by the front passenger side airbag will now rebound diagonally rearward with respect to the vehicle. At this time, with the vehicle airbag system according to this aspect, the second inflator is activated by the controller. Consequently, gas is supplied into the curtain airbag that is stored between the roof side rail portion and the roof head lining. As a result, the curtain airbag is inflated and deployed below the roof side rail portion, such that the rebounded head of the occupant is received.

In this way, according to the vehicle airbag system according to this aspect, the front passenger side airbag and the curtain airbag are inflated and deployed in succession, matching the behavior of the head of the seated occupant when a small overlap collision occurs.

According to the second aspect, the side airbag is stored in the door trim or the side portion on the side door side of the seat back. When a small overlap collision occurs, the third inflator is activated after the second inflator is activated by the controller. Consequently, gas is supplied into the side airbag, and the side airbag is inflated and deployed between the side door and the side portion of the seated occupant on the outside in the vehicle width direction. As a result, the seated occupant is pushed toward the inside in the vehicle width direction by the inflated and deployed curtain airbag, so the head of the seated occupant that has rebounded and been received by the curtain airbag will also be pushed back toward the inside in the vehicle width direction (the side where seating posture in the vehicle seat becomes normal).

According to the third aspect, the front passenger side airbag has an outside chamber that is inflated and deployed on an outside in the vehicle width direction, and an inside chamber that is inflated and deployed on an inside in the vehicle width direction. Therefore, the head of the seated occupant is received by a boundary portion of the outside chamber and the inside chamber, and the head will rebound with the boundary portion of these two as the starting point.

Here, in this aspect, the amount that the outside chamber protrudes toward the vehicle rear side is larger than the amount that the inside chamber protrudes toward the vehicle rear side, so when the head of the seated occupant rebounds, the head will rebound following a trajectory on the inside in the vehicle width direction, by the amount of the thickness of the outside chamber in the vehicle width direction.

According to the fourth aspect, the front passenger side airbag has an outside chamber that is inflated and deployed on an outside in the vehicle width direction, and an inside chamber that is inflated and deployed on an inside in the vehicle width direction. Therefore, the head of the seated occupant is received near the outside chamber, and the head will rebound with that portion as the starting point.

Here, in this aspect, an internal pressure of the outside chamber is higher than an internal pressure of the inside chamber, so when the head of the seated occupant rebounds, the head will receive a larger reaction force from the outside chamber. As a result, the head will rebound following a trajectory on the inside in the vehicle width direction, by the amount of the internal pressure difference.

According to the fifth aspect, when an inflated and deployed state of the curtain airbag and the front passenger side airbag is viewed in a side view, there is an area where the curtain airbag and the front passenger side airbag overlap.

However, in this aspect, a delay chamber is set in the area where these two overlap, so the main body portion of the curtain airbag inflates and deploys first, and then after a delay, the delay chamber is inflated and deployed. Therefore, a situation in which deployment of the main body portion of the curtain airbag is impeded by this overlapping area of the side airbag interfering with the front passenger side airbag that has started to inflate and deploy first will not easily occur.

Effect of the Invention

As described above, the vehicle airbag system according to the first aspect is able to effectively protect the head of an occupant seated in a front passenger seat when a small overlap collision occurs.

The vehicle airbag system according to the second aspect has a beneficial effect in which the head of the seated occupant that has rebounded by the front passenger side airbag and been received by the curtain airbag is able to be returned to a state close to a normally seated posture.

The vehicle airbag system according to the third aspect has a beneficial effect in which the trajectory of the head of the seated occupant when it rebounds is able to be brought closer (adjusted) to the inside in the vehicle width direction.

The vehicle airbag system according to the fourth aspect has a beneficial effect in which the trajectory of the head of the seated occupant when it rebounds is able to be brought closer (adjusted) to the inside in the vehicle width direction.

The vehicle airbag system according to the fifth aspect has a beneficial effect in which it is able to appropriately protect the head of the seated occupant even if a portion of the curtain airbag is in a positional relationship in which it crosses the front passenger side airbag.

BEST MODE FOR CARRYING OUT THE INVENTION

Hereinafter, one example embodiment of the vehicle airbag system according to this aspect will be described using FIG. 1 to FIG. 9. Arrow FR shown appropriately in these drawings indicates a vehicle front side, arrow UP indicates a vehicle up side, and arrow In indicates an inside in a vehicle width direction.

Figure 5:
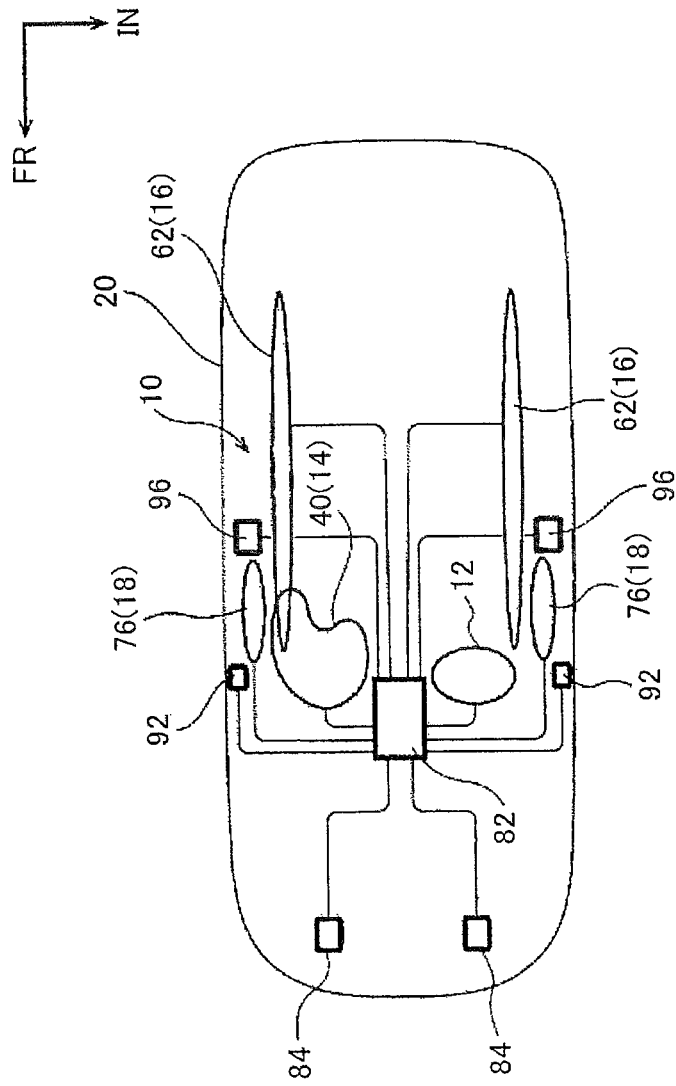
FIG. 5 is a plan view schematically showing the structure of the vehicle airbag system shown in FIG. 1.

In FIG. 5, the general structure of the overall system of a vehicle airbag system 10 according to this aspect is shown in a plan view. As shown in this drawing, the vehicle airbag system 10 includes, as devices of which activation is controlled by a controller 82 that will be described later, a driver side airbag device 12, a front passenger side airbag device 14, a pair of left and right curtain airbag devices 16, and a pair of left and right side airbag devices 18. First, the structures of these devices will be described.

Figure 4:
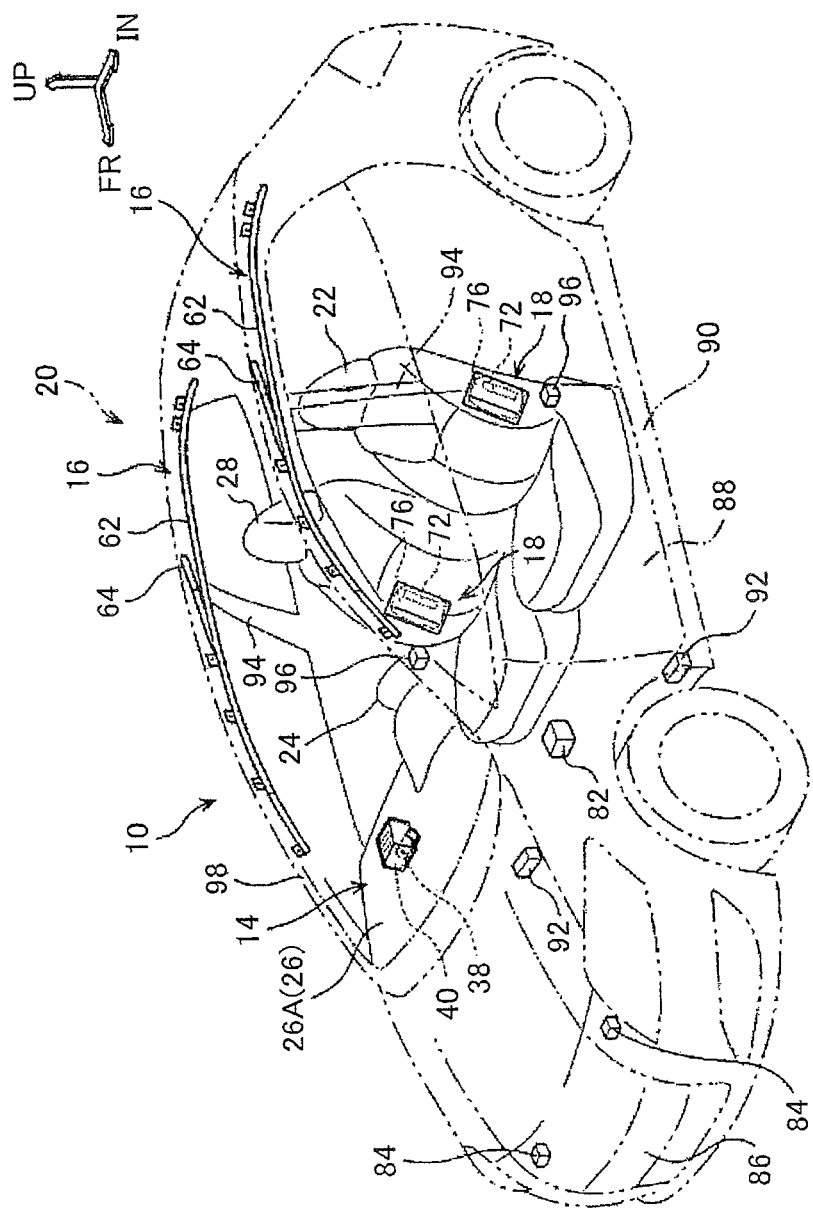
FIG. 4 is a perspective view of a state in which the vehicle airbag system shown in FIG. 1 is mounted in a vehicle.

As shown in FIG. 4, a steering wheel 24 is arranged on a vehicle front side of a driver seat 22 of a vehicle 20. A wheel pad, not shown, is arranged at a center portion of this steering wheel 24, and the driver side airbag device 12 (see.

FIG. 5) is stored inside this wheel pad. The driver side airbag device 12 is not a main part of the vehicle airbag system 10 according to this aspect, so a description of the structure itself of the driver side airbag device 12 will be omitted.

Figure 7:
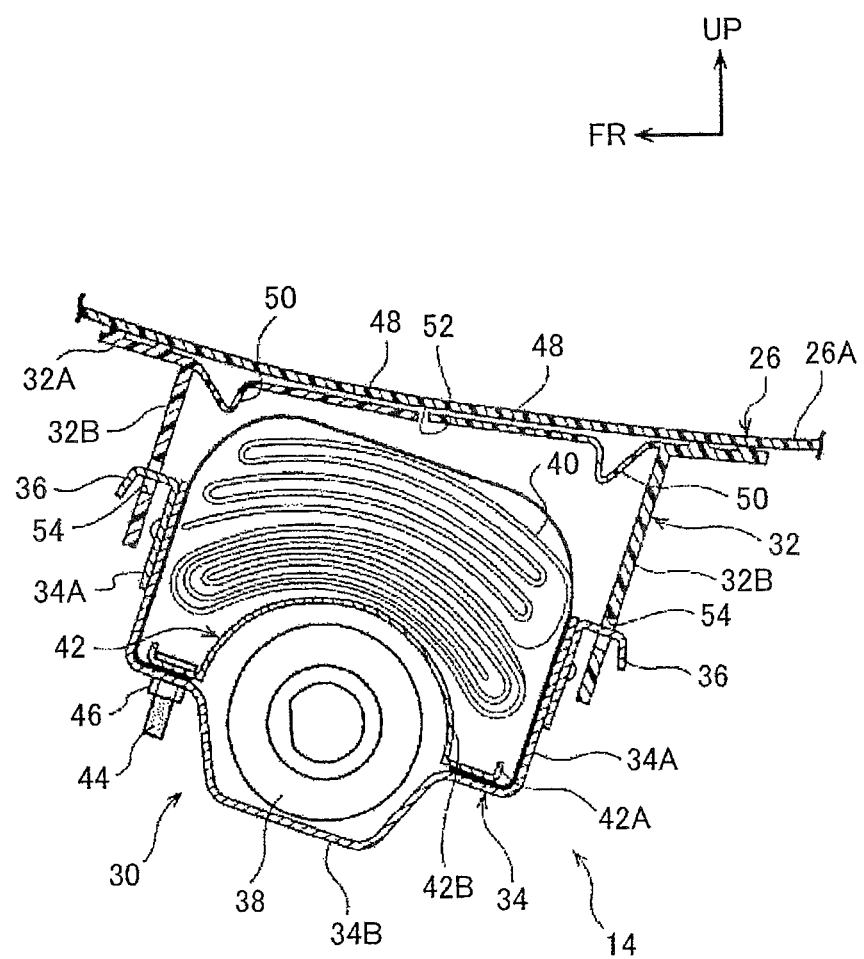
FIG. 7 is an enlarged longitudinal sectional view showing, enlarged, a state in which a front passenger side airbag device shown in FIG. 4 has been cut along a vehicle longitudinal direction.

As shown in FIG. 1 to FIG. 4, the front passenger side airbag device 14 is arranged on a front passenger seat 28 side of an upper surface portion 26A of an instrument panel 26. As shown in FIG. 7, this front passenger side airbag device 14 is formed by an airbag module 30 inside of which the functional parts are housed, and an airbag door 32 that is provided on the upper surface portion 26A side of the instrument panel 26.

The airbag module 30 includes a metal module case 34 formed in a general box shape. A plurality of hooks 36 having a longitudinal sectional shape that is formed in a general L-shape are attached to front and rear side wall portions 34A of the module case 34. Also, a first inflator 38 having a circular cylindrical shape is arranged in the center of a bottom wall portion 34B of the module case 34. Furthermore, a passenger side airbag 40 is stored, in a state folded up above the first inflator 38, inside the module case 34.

Figure 1:
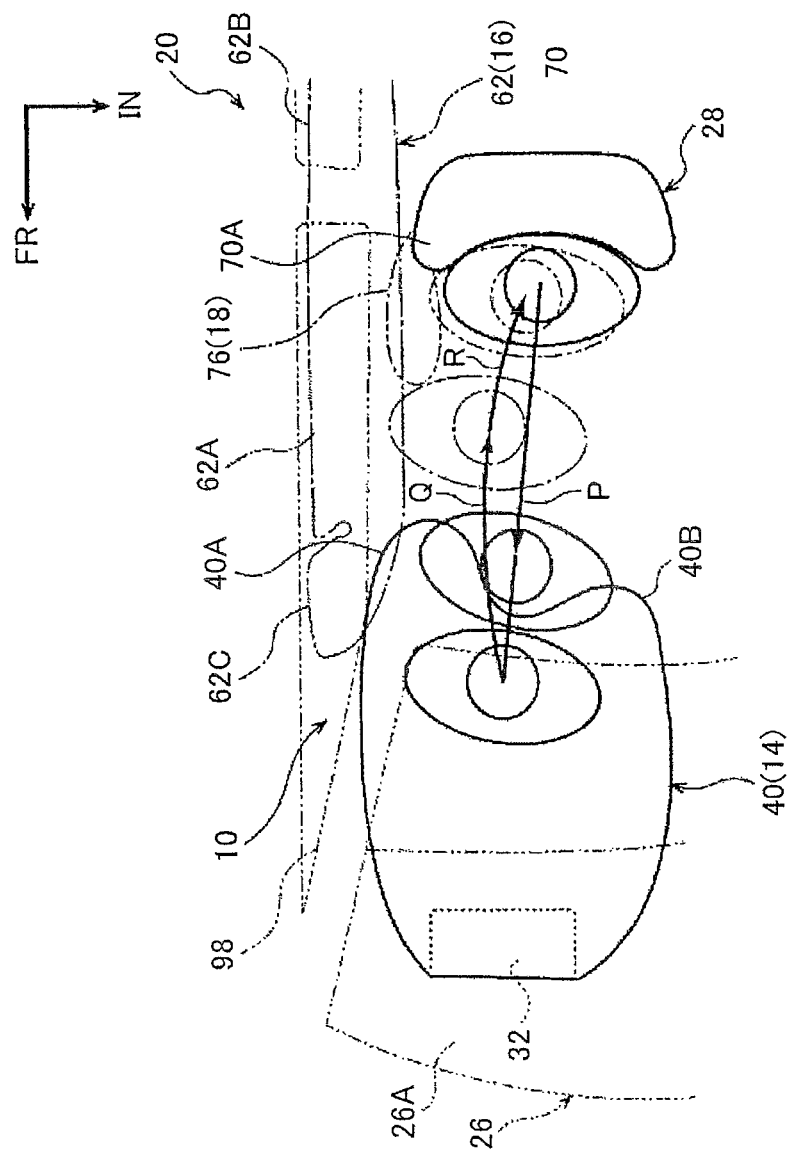
FIG. 1 is a plan view of the overall structure of a vehicle airbag system according to this aspect.
Figure 2:
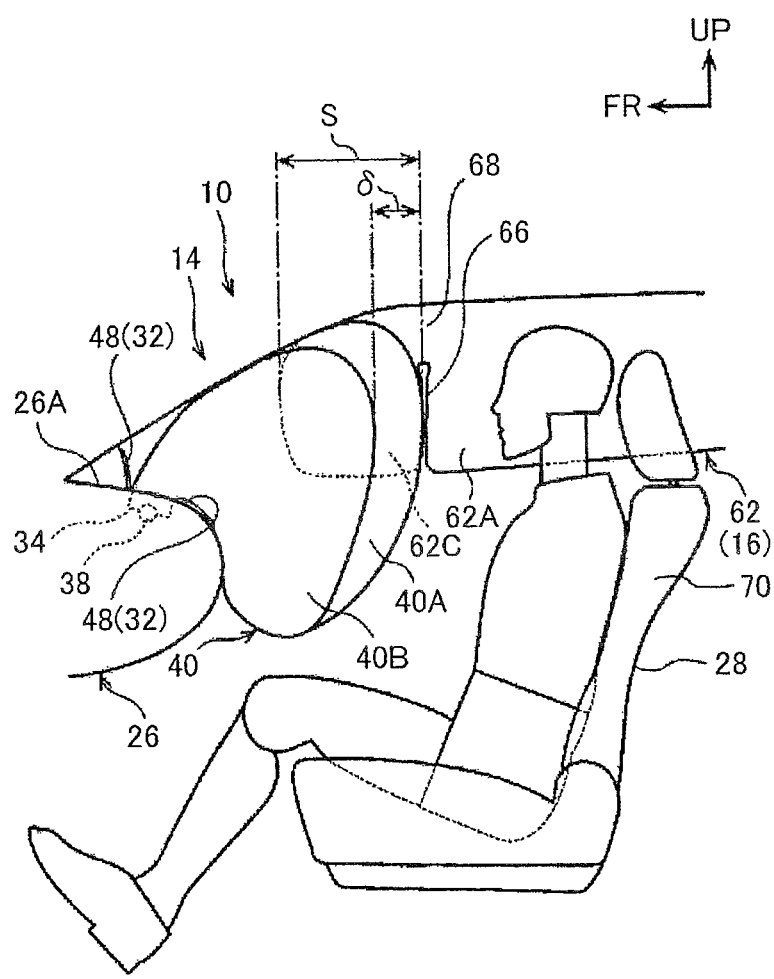
FIG. 2 is a side view of the vehicle airbag system shown in FIG. 1.
Figure 3:
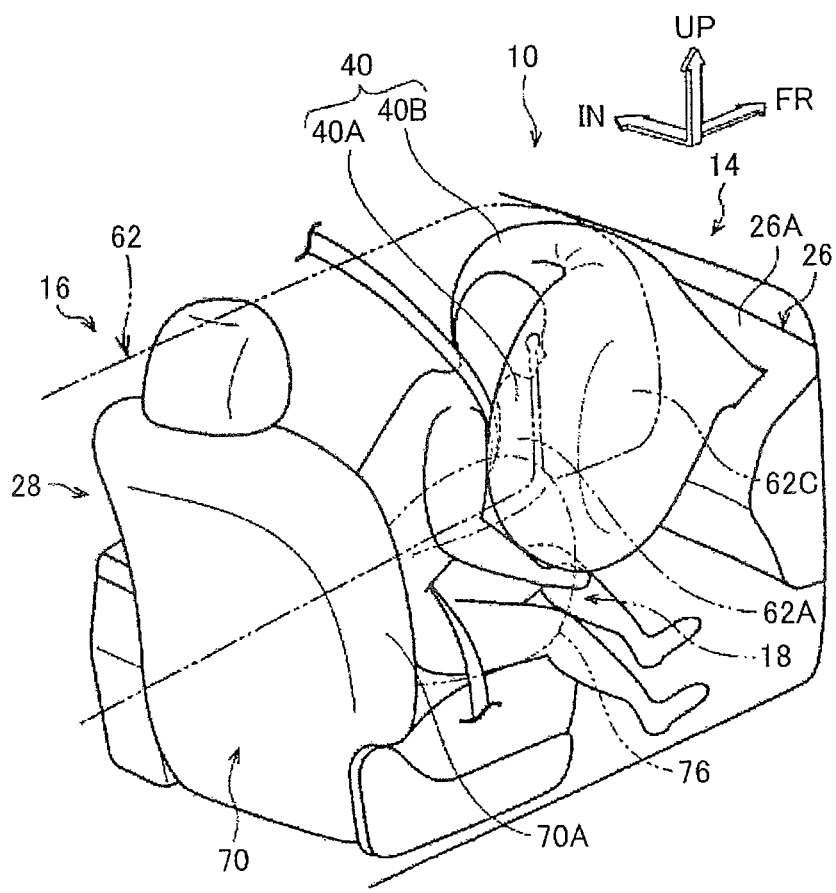
FIG. 3 is a perspective view showing a state in which each airbag of the vehicle airbag system shown in FIG. 1 is inflated and deployed.

As shown in FIG. 1 to FIG. 3, the front passenger side airbag 40 of this aspect includes an outside chamber 40A arranged on an outside in the vehicle width direction, and an inside chamber 40B arranged on the inside in the vehicle width direction, when in an inflated and deployed state. Moreover, the outside chamber 40A is formed such that a protruding amount toward the vehicle rear side is larger by σ (see FIG. 2) than that of the inside chamber 40B. The outside chamber and the inside chamber may be such that bags themselves that form these are completely separated, or a dividing cloth such as a tether may be arranged inside of a single front passenger airbag to divide the chamber into two. Furthermore, when an internal pressure may be made the same in the outside chamber and the inside chamber, a rear end portion of the front passenger side airbag may be pulled toward the vehicle front side by a strap.

Returning to FIG. 7, a metal diffuser 42 having a longitudinal sectional shape that is a generally semicylindrical shape is interposed between the front passenger side airbag 40 and the first inflator 38. The diffuser 42 is formed by a frame-like portion 42A that is formed in a rectangular frame shape in a plan view, and a rectifying portion 42B that is formed in a semicylindrical shape in the center portion of this frame-like portion 42A. The frame-like portion 42A sandwiches a base end portion on an open side of the front passenger side airbag 40 between it and the bottom wall portion 34B of the module case 34 (this point is not shown in FIG. 7), and is fastened to the bottom wall portion 34B by a stud bolt 44 and a nut 46. Also, two types of openings, i.e., an outside opening, not shown, that is positioned on the outside in the vehicle width direction and supplies gas to the outside chamber 40A, and an inside opening, not shown, that is positioned on the inside in the vehicle width direction and supplies gas to the inside chamber 40B, are formed in the rectifying portion 42B. The open area of the outside opening is set larger than the open area of the inside opening, and the internal pressure of the outside chamber 40A is set to be higher than the internal pressure of the inside chamber 40B. However, the open area of the openings may also be made the same, and three openings, for example, may also be formed along an axial direction of the first inflator 38, and two of these openings may be used as the outside opening, and the remaining one opening may be used as the inside opening.

The airbag module 30 described above is supported by a bracket on an instrument panel reinforcement, not shown, that is made of metal and is arranged with the vehicle width direction as the longitudinal direction, on the inside of the instrument panel 26.

Also, the airbag module 30 described above is closed off by the airbag door 32. The airbag door 32 includes a top portion 32A arranged on a lower surface side of the upper surface portion 26A of the instrument panel 26, and a leg portion 32B that extends from this top portion 32A toward the module case 34 side. A pair of front and rear door portions 48 are provided, each via a hinge portion 50, on the top portion 32A. A thin portion 52 is formed, except for at the hinge portions 50, on a peripheral edge portion of the door portions 48. Engaging holes 54 corresponding to the hooks 36 of the module case 34 are formed in the leg portion 32B. The airbag module 30 is floatingly supported by the instrument panel reinforcement by the hooks 36 being engaged in these engaging holes 54.

Figure 8:
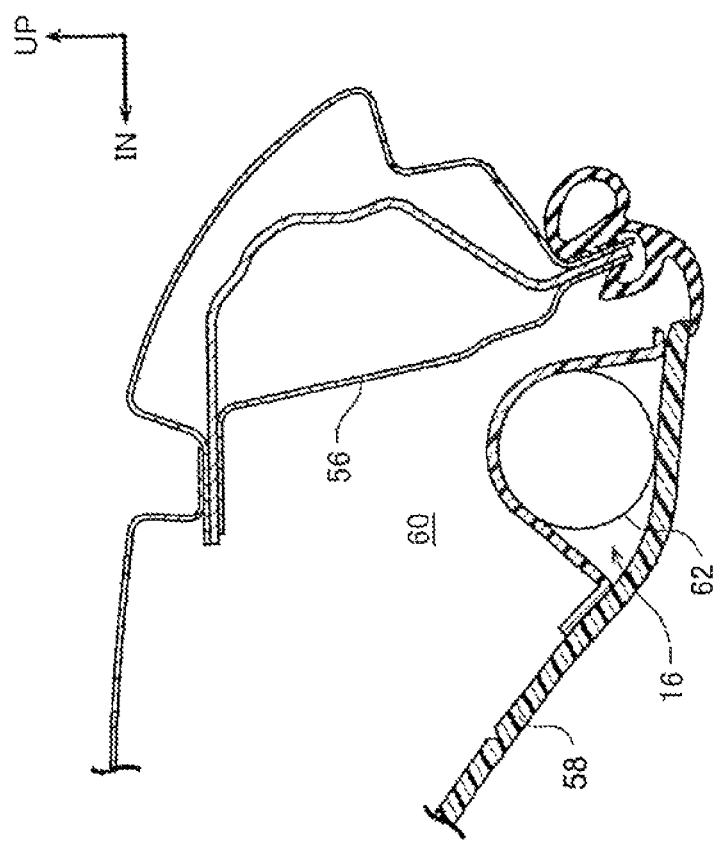
FIG. 8 is an enlarged transverse sectional view showing, enlarged, a state in which a curtain airbag device shown in FIG. 4 has been cut along a vehicle width direction.

Next, the curtain airbag device 16 will be described. As shown in FIG. 8, the curtain airbag device 16 is stored in a space 60 between a roof side rail portion 56 and a roof head lining 58 of the vehicle 20. The curtain airbag device 16 is formed including a curtain airbag 62 that is folded up in an elongated shape that is long and thin in the vehicle longitudinal direction, and a second inflator 64 (see FIG. 4) that has a circular cylindrical shape and is connected to near a longitudinally middle portion of this curtain airbag 62.

As shown in FIG. 1, the curtain airbag 62 described above is formed including a front side inflating portion 62A that is arranged to the side of the head of an occupant seated in the front passenger seat 28, and a rear side inflating portion 62B that is arranged to the side of the head of an occupant seated in a rear seat. Furthermore, as shown in FIG. 2, when the inflated and deployed state of the curtain airbag 62 and the front passenger side airbag 40 are viewed in a side view, a delay chamber 62C that is inflated and deployed later than the front side inflating portion 62A (and the rear side inflating portion 62B) is set in an area S where the curtain airbag 62 and the outside chamber 40A of the front passenger side airbag 40 overlap, in the curtain airbag 62. To simplify the description, the reference numeral of the delay chamber and the reference number of the front side inflating portion are different, but the delay chamber 62C is part of the front side inflating portion 62A.

More specifically, a non-inflating portion 66 is set in the vehicle vertical direction, except for at an upper end portion, between the front side inflating portion 62A and the delay chamber 62C. As a result, the front side inflating portion 62A and the delay chamber 62C of the curtain airbag 62 are such that gas is supplied only via a communicating portion 68 set in the upper end portion between these.

Figure 9:
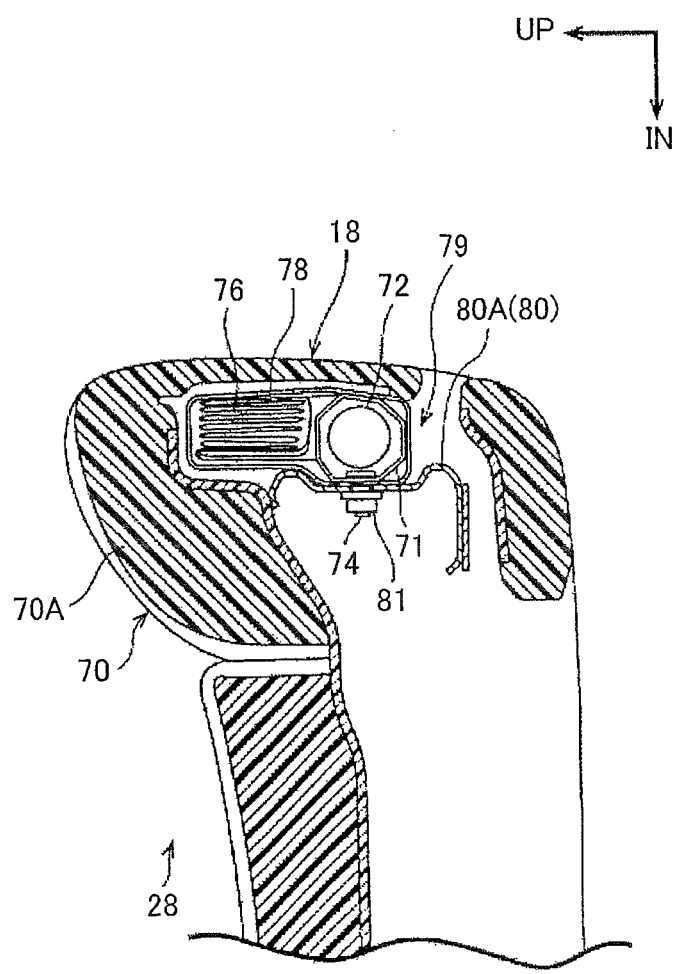
FIG. 9 is an enlarged top sectional view showing, enlarged, a state in which a side airbag device shown in FIG. 4 has been cut horizontally.

Next, the side airbag device 18 will be described. As shown in FIG. 4 and the like, the side airbag device 18 is arranged in a side portion 70A, on the outside in the vehicle width direction, of a seat back 70 of the front passenger seat 28. More specifically, as shown in FIG. 9, the side airbag device 18 includes a metal diffuser 71 formed in a generally cylindrical shape. A third inflator 72 having a circular cylindrical shape is inserted into and fixed to the inside of this diffuser 71. Also, a pair of upper and lower stud bolts 74 are provided erect on an outer peripheral portion of the diffuser 71. A side airbag module 79 is formed by the diffuser 71 and the third inflator 72 in this state being inserted into a folded-up side airbag 76, and then being covered by a breakable cover 78. The stud bolts 74 are inserted through bolt insertion holes formed in a side frame 80A of a seat back frame 80, and nuts 81 are then screwed onto through end portions of the stud bolts 74. As a result, the side airbag module 79 is fixed to a surface on the outside of the side frame 80A in the seat width direction, with the side airbag 76 sandwiched between the diffuser 71 and the side frame 80A.

Figure 6:
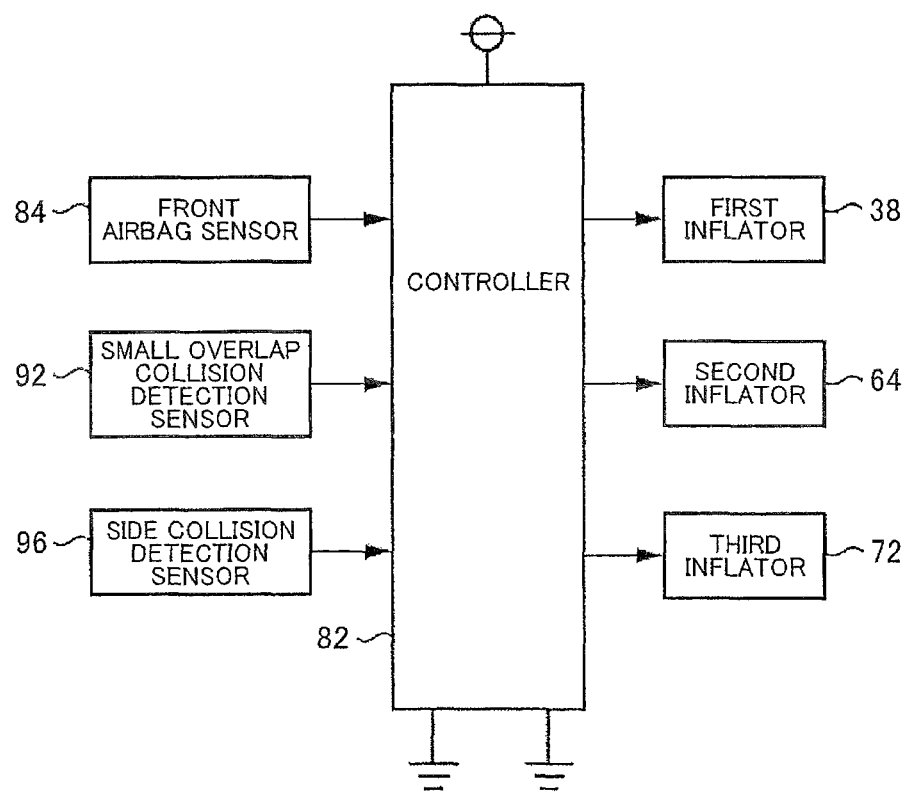
FIG. 6 is a block view of the vehicle airbag system shown in FIG. 1.

As shown in FIG. 4 to FIG. 6, the controller 82 is arranged below a console box, not shown. A pair of left and right front airbag sensors (front satellite sensors) 84 are connected to this controller 82. The pair of left and right front airbag sensors 84 are provided on a vehicle rear side of a front bumper 86 that is arranged along a vehicle width direction on a front end portion of the vehicle 20. Also, the front airbag sensor 84 detects that the vehicle 20 has been involved in a frontal collision and outputs that detection signal to the controller 82. Also, a rocker 90 that has a closed sectional structure and forms a vehicle body frame member extends along in the vehicle longitudinal direction below a front side door 88 of the vehicle 20. A small overlap collision detection sensor 92 is arranged on a front end portion side of this rocker 90. The small overlap collision detection sensor 92 detects that the vehicle 20 has been involved in a small overlap collision and outputs that detection signal to the controller 82. Further, a side collision detection sensor 96 is arranged on a lower portion side of a center pillar 94. This side collision detection sensor 96 detects that the vehicle 20 has been involved in a side collision and outputs that detection signal to the controller 82. Acceleration sensors or the like, for example, may be applied as the front airbag sensor 84, the small overlap collision detection sensor 92, and the side collision detection sensor 96.

Also, squibs (ignition devices) of the first inflator 38, the second inflator 64, and the third inflator 72 are each connected to, and activation thereof is controlled by, the controller 82 described above. More specifically, in this aspect, the second inflator 64 is activated after inflation and deployment of the front passenger side airbag 40 is complete. More specifically, the second inflator 64 is set to activate after a predetermined period of time has passed after the first inflator 38 is activated (as one example, when 50 to 150 [ms] have passed after activation of the first inflator 38). Also, the third inflator 72 is set to be activated after a predetermined period of time has passed after the second inflator 64 is activated (as one example, when 10 to 50 [ms] have passed after activation of the second inflator 64).

Next, the operation and effects of this example embodiment will be described.

When the vehicle 20 is involved in a small overlap collision, normally, the head of an occupant seated in the front passenger seat 28 would inertially move diagonally forward with respect to the vehicle (toward the front pillar 98 side).

However, when a small overlap collision occurs, this state is detected by the small overlap collision detection sensor 92. Therefore, a detection signal is transmitted from the small overlap collision detection sensor 92 to the controller 82. The controller 82 makes a collision determination. If it is determined by the controller 82 that a small overlap collision has occurred, first a predetermined current is carried to the squib of the first inflator 38. As a result, the first inflator 38 is activated and a large amount of gas is produced. The produced gas is rectified by the diffuser 42, and supplied into the front passenger side airbag 40 that is in a folded state. As a result, the upper surface portion 26A of the instrument panel 26 breaks in an H-shape along the thin portion 52, and the pair of door portions 48 deploy to the front and rear. Accordingly, as shown by the solid line in FIG. 1, the front passenger side airbag 40 is inflated and deployed toward the front passenger seat 28 side, and the head of the seated occupant that has come to be inertially moved diagonally forward with respect to the vehicle is received. The movement path of the head of the seated occupant at this time is indicated by arrow P. See FIG. 3 as well.

However, the head of the seated occupant that has been received by the front passenger side airbag 40 will rebound diagonally rearward with respect to the vehicle this time, as shown by the alternate long and short dash line in FIG. 1. At this time, with the vehicle airbag system 10 according to this aspect, the second inflator 64 is activated by the controller 82. Consequently, gas is supplied into the curtain airbag 62 that is stored between the roof side rail portion 56 and the roof head lining 58. As a result, the curtain airbag 62 is inflated and deployed downward of the roof side rail portion 56, so the rebounded head of the occupant is received. The movement path of the head of the seated occupant at this time is indicated by arrow Q. The second inflator 64 is activated after a predetermined period of time has passed after the first inflator 38 is activated.

In this way, with the vehicle airbag system 10 according to this aspect, the front passenger side airbag 40 and the curtain airbag 62 are inflated and deployed in succession, matching the behavior of the head of the seated occupant at the time of a small overlap collision. As a result, the vehicle airbag system 10 according to this aspect is able to effectively protect the head of an occupant seated in the front passenger seat 28 when a small overlap collision occurs. On the driver side as well the vehicle airbag system 10 activates the same as it does on the front passenger seat 28 side when a small overlap collision occurs. That is, after the inflation and deployment of the driver side airbag is complete, the driver side curtain airbag device is activated, and finally the driver side side airbag device is activated.

Also, the side airbag 76 is stored inside a side portion on the front side door 88 side of the seat back 70, and when a small overlap collision occurs, the third inflator 72 is activated after a predetermined period of time has passed after the stud bolts 74 is activated by the controller 82. Accordingly, gas is supplied into the side airbag 76, and the side airbag 76 is inflated and deployed between the front side door 88 and a side portion of the seated occupant that is on the outside in the vehicle width direction. As a result, the seated occupant is pushed toward the inside in the vehicle width direction by the curtain airbag 62 that has inflated and deployed, so the head of the seated occupant that has rebounded and been received by the curtain airbag 62 is also pushed back toward the inside in the vehicle width direction (the side where seating posture in the front passenger seat 28 becomes normal). The movement path of the head of the seated occupant at this time is indicated by arrow R. As described above, according to this example embodiment, the head of the seated occupant that has rebounded by the front passenger side airbag 40 and been received by the curtain airbag 62 is able to return to a state close to a normally seated posture Furthermore, the front passenger side airbag 40 has an airbag structure (a twin chamber structure or an omni bag structure) that includes the outside chamber 40A that inflates and deploys on the outside in the vehicle width direction, and the inside chamber 40B that inflates and deploys on the inside in the vehicle width direction. Therefore, the head of the seated occupant is received by a portion near the outside chamber 40A, and rebounds with this portion as the starting point.

Here, in this aspect, the amount that the outside chamber 40A protrudes toward the vehicle rear side is larger by σ than the amount that the inside chamber protrudes toward the vehicle rear side, so when the head of the seated occupant rebounds, the head will rebound following the trajectory on the inside in the vehicle width direction by the amount of the thickness of the front passenger side airbag 40 in the vehicle width direction (see movement path P in FIG. 1). As a result, according to this example embodiment, the trajectory of the head of the seated occupant when it rebounds is able to be brought closer (adjusted) to the inside in the vehicle width direction.

Also, in this aspect, the internal pressure of the outside chamber 40A is higher than the internal pressure of the inside chamber 40B, so when the head of the seated occupant rebounds, the head will receive a larger reaction force from the outside chamber 40A. As a result, the head will rebound following the trajectory on the inside in the vehicle width direction, by the amount of the internal pressure difference. Thus, from this aspect as well, the trajectory of the head of the seated occupant when it rebounds is able to be brought closer (adjusted) to the inside in the vehicle width direction.

Furthermore, in this aspect, when the inflated and deployed state of the curtain airbag 62 and the front passenger side airbag 40 is viewed in a side view, there is the area S where the curtain airbag 62 and the front passenger side airbag 40 overlap. However, in this aspect, the delay chamber 62C is set in the area where these two overlap, so the curtain airbag 62 is such that the front side inflating portion 62A (and the rear side inflating portion 62B) that is the main body portion inflates and deploys first, and after a delay, the delay chamber 62C is then inflated and deployed. Therefore, a situation in which deployment of the front side inflating portion 62A of the curtain airbag 62 is impeded by the overlapping area S of the side airbag 76 interfering with the front passenger side airbag 40 that has started to inflate and deploy first will not easily occur. As a result, according to this aspect, even if a portion of the curtain airbag 62 is in a positional relationship in which it crosses the front passenger side airbag 40, the head of the seated occupant is able to be appropriately protected.

In the aspect described above, the small overlap collision detection sensor 92 is provided on the rocker 90, but it is not limited to this. It may also be provided in a different location, such as on a corner portion of a bumper reinforcement or the like. Also, in the aspect described above, the small overlap collision detection sensor 92 is provided separately and independently, but the small overlap collision detection sensor does not necessarily have to be provided separately and independently. For example, if it is possible to detect that a small overlap collision has occurred by using a plurality of onboard sensors in combination, this kind of structure may also be employed. Furthermore, the vehicle airbag system according to this aspect may always be activated when a frontal collision occurs.

Also, in the aspect described above, the internal pressure of the outside chamber 40A of the front passenger side airbag 40 is set to become higher than the internal pressure of the inside chamber 40B, but it is not limited to this. It may also be set to become the same internal pressure.

Furthermore, in the aspect described above, the front passenger side airbag 40 in which the amount that the outside chamber 40A protrudes toward the vehicle rear side is larger than the amount that the inside chamber 40B protrudes toward the vehicle rear side is used, but it is not limited to this. A twin chamber type (an omni bag type) front passenger side airbag in which there is no difference in the amount of protrusion toward the vehicle rear side may also be used. In this case, the internal pressure of the outside chamber is preferably set higher than the internal pressure of the inside chamber.

Also, in the aspect described above, the side airbag device 18 is provided in the side portion 70A of the seat back 70 on the outside in the vehicle width direction, but it is not limited to this. A side airbag device may also be arranged in a door trim of a front side door.

The invention claimed is:

1. A vehicle airbag system comprising:
    a front passenger side airbag that is stored on a front passenger seat side of an instrument panel of a host vehicle, and that inflates and deploys toward the front passenger seat side by a first inflator being activated and gas being supplied;
    a curtain airbag that is stored between a roof side rail portion and a roof head lining, and that is inflated and deployed inward with respect to a side door in a vehicle width direction of the host vehicle by a second inflator being activated and gas being supplied;
    a side airbag that is stored in a door trim of the host vehicle or a side portion on a side door side of a seat back of the host vehicle, and that is inflated and deployed toward a seat front side of the host vehicle by a third inflator being activated and gas being supplied;
    a small overlap collision detection sensor configured to:
        detect that another vehicle that is different from the host vehicle has frontally collided with a narrow region that is on the outside in the vehicle width direction of the host vehicle, of a front side member of the host vehicle as a small overlap collision, and
        when the small overlap collision is detected, transmit a signal indicating detection of the small overlap collision; and
    a controller that:
        is connected to the small overlap collision detection sensor, the first inflator, the second inflator, and the third inflator, and
        when the signal indicating detection of the small overlap collision is received, activates the first inflator, the second inflator, and the third inflator in this order, wherein after inflation and deployment of the front passenger side airbag is complete, the second inflator is activated, and after the second activator is activated, the third inflator is activated.

2. The vehicle airbag system according to claim 1, wherein the front passenger side airbag has an airbag structure in which an amount that an outside chamber that is inflated and deployed on an outside in the vehicle width direction protrudes toward a vehicle rear side is larger than an amount that an inside chamber that is inflated and deployed on an inside in the vehicle width direction protrudes toward the vehicle rear side.

3. The vehicle airbag system according to claim 1, wherein
    the front passenger side airbag includes an outside chamber and an inside chamber,
    the outside chamber is inflated and deployed on an outside in the vehicle width direction,
    the inside chamber is inflated and deployed on an inside in the vehicle width direction, and
    an internal pressure of the outside chamber is set higher than an internal pressure of the inside chamber.

4. The vehicle airbag system according claim 1, wherein the curtain airbag includes a delay chamber and a main body portion of the curtain airbag,
the delay chamber is inflated and deployed later than the main body portion of the curtain airbag, and
when an inflated and deployed state of the curtain airbag and the front passenger side airbag is viewed in a side view, the delay chamber is set in an area where the curtain airbag and the front passenger side airbag overlap.

5. The vehicle airbag system according to claim 1, wherein the controller is configured to control the front passenger side airbag to inflate at a timing so as to cause a head of a seated occupant to rebound diagonally rearward to be received by the curtain airbag.

6. The vehicle airbag system according to claim 1, wherein the controller is configured to, when the small overlap collision occurs, after a head of an occupant inertially moves diagonally forward toward a front pillar side and is received by the front passenger side airbag, control the first activator to deploy the front passenger side airbag to cause the head to rebound and move towards a rear of the vehicle.

\* \* \* \* \*